Figure 1:
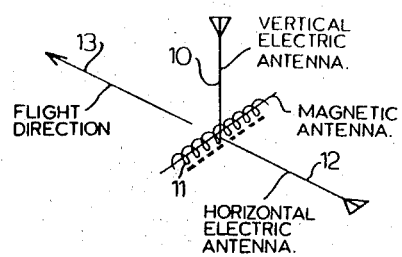

United States Patent [19]
Barringer

[11] 3,763,419
[45] Oct. 2, 1973

[54] GEOPHYSICAL EXPLORATION METHOD USING THE VERTICAL ELECTRIC COMPONENT OF A VLF FIELD AS A REFERENCE

[75] Inventor: Anthony Rene Barringer, Willowdale, Ontario, Canada

[73] Assignee: Barringer Research Limited, Rexdale, Ontario, Canada

[22] Filed: Mar. 23, 1971

[21] Appl. No.: 127,225

Related U.S. Application Data

[62] Division of Ser. No. 804,780, March 6, 1969, Pat. No. 3,594,633.

[52] U.S. Cl. .......................................... 324/6, 324/7
[51] Int. Cl. ......................... G01v 3/12, G01v 3/16
[58] Field of Search ..................................... 324/6–8, 324/3, 4

[56] References Cited
UNITED STATES PATENTS

| | | | |
|---|---|---|---|
| 3,500,175 | 3/1970 | Ronka | 324/7 X |
| 2,677,801 | 5/1954 | Cagniard | 324/8 X |
| 3,422,345 | 1/1969 | Muse | 324/8 X |
| 3,548,299 | 12/1970 | Duroux et al. | 324/6 |
| 3,087,111 | 4/1963 | Lehan et al. | 324/7 X |

FOREIGN PATENTS OR APPLICATIONS

| | | | |
|---|---|---|---|
| 664,217 | 6/1963 | Canada | 324/6 |

Primary Examiner—Gerard R. Strecker
Attorney—Rogers, Bereskin & Parr

[57] ABSTRACT

A geophysical exploration method and apparatus utilizing VLF fields produced by distant transmitters as a source of primary filed. The vertical electric alternating field component of the primary field is used as a stabel reference against which variations in magnetic alternating field components caused by inhomogeneities in earth conductivity can be measured.

7 Claims, 4 Drawing Figures

GEOPHYSICAL EXPLORATION METHOD USING THE VERTICAL ELECTRIC COMPONENT OF A VLF FIELD AS A REFERENCE

This application is a division of application Ser. No. 804,780, filed Mar. 6, 1969, now U.S. Pat. No. 3,594,633.

This invention relates to the art of geophysics, and in particular to an improved geophysical exploration system which utilizes signals transmitted by distant radio stations, particularly those operating in the VLF (very low frequency) band.

In recent years a number of very high powered VLF radio transmitters operating in the band between about 14–30 KHz. have been constructed by the U.S. Navy and other organizations throughout the world. The signals transmitted by these stations propagate as a ground wave for thousands of miles and penetrate deeply below the earth's surface, depending on the frequency and earth conductivity. The ground wave induces eddy currents in dipping sheets of conductivity such as geological fault zones, graphitic beds, contacts and sulphide orebodies and is also associated with small currents which flow in directions which are radial to the transmitter in homogeneous or horizontally stratified ground.

The present invention utilizes the ground wave produced by electromagnetic sources such as VLF transmitters to detect the presence of dipping conductive sheets in underlying terrain, to measure the strike direction of these sheets and in general to identify the presence of inhomogeneities in the conductivity of the earth. The invention is based upon the fact that the vertical electric field component of the ground wave is only slightly affected by local variations in conductivity of underlying terrain, whereas the magnetic field component of the ground wave is greatly influenced in both phase and amplitude by the existence of dipping conductive sheets and to a somewhat lesser extent by changes in the impedance of the underlying terrain. In the present invention the vertical electrical field is used as a stable reference against which variations in both phase and amplitude of the magnetic field can be measured.

In its simplest form the invention employs at least one horizontal magnetic dipole antenna or other directional magnetic field sensing device and a vertical electric antenna. The magnetic dipole antenna is sensitive to horizontal magnetic field components and the vertical antenna is sensitive to the vertical component of the electric field associated with the ground wave. Signals induced in the magnetic dipole antenna are separated into (a) components which are in-phase or 180° out of phase with the vertical electric field of the ground wave (hereinafter called in-phase components) and (b) components which are 90° out of phase with the vertical electric field of the ground wave (hereinafter called quadrature components). Analysis of the in-phase and quadrature components provides considerable information concerning the nature of the underlying geological structure. A more sophisticated form of the invention employs two mutually orthogonal horizontal magnetic dipole antennas, one aligned with the flight direction and the other perpendicular thereto, in order to obtain the direction and amplitude of the total in phase and quadrature horizontal magnetic field, so that the strike direction of the conductors can be determined. A third magnetic dipole antenna, positioned vertically, can be employed to determine the dip angle of the plane of polarization of the resultant magnetic field, if desired.

Another embodiment of the invention is similar to the above except for the addition of a horizontal electric antenna consisting of a long wire which is trailed behind the aircraft. The horizontal trailing electric antenna is approximately in minimum coupling with the vertical component of the electric field of the ground wave and produces a small signal which is highly dependent upon the inclination of the antenna. However, by measuring the component of the horizontal electric field which is in phase quadrature to the vertical electric field, the system is essentially insensitive to antenna inclination changes and the output of the antenna is then related to the impedance of the underlying terrain. This measurement of the quadrature horizontal electric field is chiefly applicable to homogeneous or horizontally stratified ground, such as in areas of deep aluvium, and can be used for producing resistivity maps.

The penetration achieved depends upon the conductivity of the ground and the frequency, and is typically between about 50–500 feet for VLF frequencies. The equipment is flown at heights varying between about 150 feet and 1500 feet depending upon whether it is desired to make detailed maps or to record major features only. Geological applications include the mapping of major fault zones, geological contacts and conductive marker horizons in dipping beds, and the production of resistivity maps in sedimentary areas. The latter role has considerable potential for use in water resource surveys. Other potential applications include the mapping of conductivity in large bodies of fresh water as well as seawater.

Figure 2:
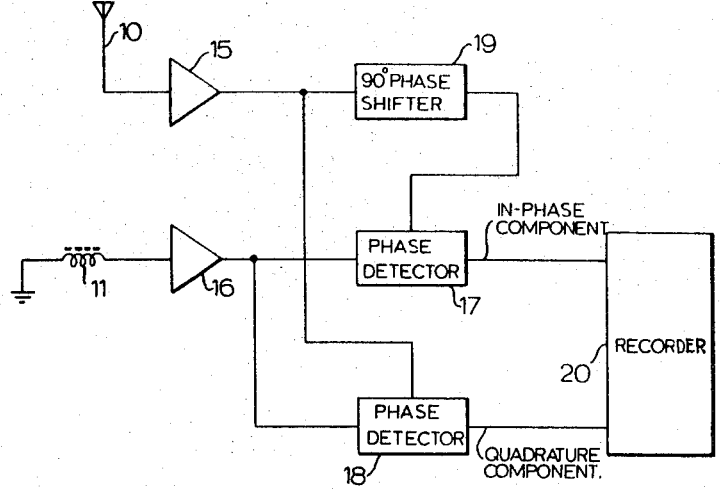
Figure 3:
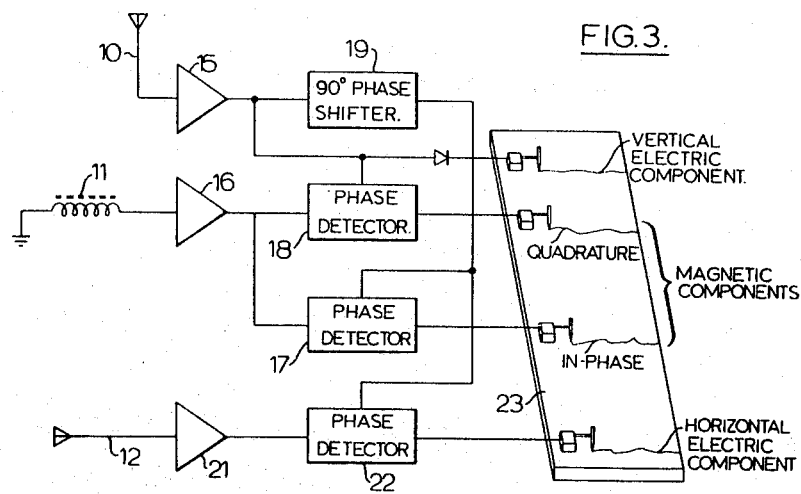
Figure 4:
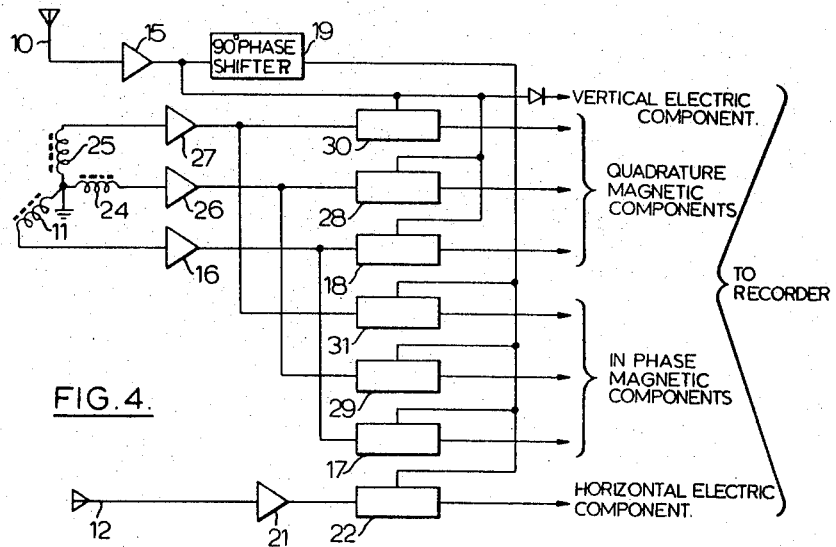

Preferred embodiments of the invention are illustrated in the accompanying drawings, wherein:

FIG. 1 is a diagrammatic view showing a typical orientation of various antennas used in the present invention with respect to flight direction;

FIG. 2 is a block diagram of a simple system for measuring in-phase and quadrature components of the magnetic field, FIG. 3 is a block diagram of a system for measuring quadrature horizontal electric, quadrature and in phase magnetic components, and the in-phase vertical electric component, and FIG. 4 is a block diagram of a system employing three mutually orthogonal magnetic dipole antennas and a horizontal electric antenna.

The principles upon which the present invention is based essentially are as follows. First, the ground wave is attributable to the flow of radio frequency current in the antenna of the VLF station. The ground wave is an electromagnetic wave having mutually orthogonal alternating electric and magnetic field components. The electric field component is normally vertically polarized, but near the ground it undergoes a slight forward tilt so that it can be resolved into a large vertical component and a small horizontal component. The magnetic field component is normally horizontal and it is aligned at right angles to the direction to the VLF station. When conductors in the earth are intersected by the magnetic field, eddy currents flow in the conductors, giving rise to secondary fields having both horizontal and vertical components at the surface, as well as components which are both in-phase with the ground wave and components which are in phase quadrature with the ground wave. As the magnetic field component of the ground wave is normally horizontal, it is in null coupling with horizontal conductive sheets and is in maximum coupling with vertical conductive sheets. Thus the secondary magnetic fields arise mainly when dipping conductors are present in the earth. Although it is preferable to measure both the in phase and the quadrature components, some experimental surveys have successfully been carried out wherein only quadrature components have been measured.

Each individual eddy current component can be regarded as a magnetic dipole. The survey aircraft is necessarily located in the near field surrounding each such magnetic dipole because the distance between the survey aircraft and the magnetic dipole is always a small fraction of a wavelength at VLF frequencies. In the near field of a magnetic dipole, the magnetic field strongly predominates over the electric field. As a result, the phase (and to a slightly lesser extent the amplitude) of the vertical electric field component is affected only to a minor degree by the presence of a dipping conductor, while the magnetic field component is very strongly affected. Thus, the vertical electric field component constitutes an ideal reference against which to measure phase and amplitude changes of the secondary fields.

Referring now to FIG. 1, the vertical component of the electric field is measured by means of a vertical whip antenna 10 which is attached to any convenient part of the aircraft or other survey vehicle. The horizontal magnetic field is measured by means of a horizontal magnetic antenna 11 such as an electrostatically shielded coil wound on a ferrite rod. It is preferable to position the horizontal magnetic antenna 11 in a fibre glass tail boom (sometimes referred to as a "stinger") which extends from the rear of the aircraft, in order to separate the horizontal magnetic antenna 11 from the metal of the aircraft. A horizontal electric antenna 12 consisting of a long wire trailed behind the aircraft is used when it is desired to measure the horizontal quadrature component of the electric field. The horizontal magnetic antenna 11 is shown at right angles to the flight direction ( represented by arrow 13).

It will be understood that if it is desired to measure the total horizontal magnetic field, an additional horizontal magnetic antenna can be employed at right angles to the one shown, and for measurements of the three dimensional magnetic field a vertical magnetic antenna can be added.

Referring to FIG. 2, a simple system is shown for measuring the in-phase and quadrature components of the horizontal magnetic field relative to the vertical electric field. The vertical electric field is sensed by the vertical electric antenna 10 which is tuned by conventional means to the desired frequency, e.g. 17.8 KHz. (NAA, Cutler, Maine). The output of the electric antenna 10 is fed to an amplifier 15, which is tuned to the desired frequency. The horizontal magnetic field is sensed by the horizontal magnetic antenna 11 which is connected to an amplifier 16, and both the magnetic antenna 11 and the amplifier 16 are tuned to the desired frequency. In order to obtain in-phase and quadrature magnetic field components, the output of the amplifier 16 is split into two parts and is fed to separate phase detectors 17 and 18. The phase detectors 17 and 18 are respectively referenced by signals which are either in phase or 90° out of phase with respect to the voltage across the antenna 10. Due to the fact that the voltage across the magnetic antenna 11 is 90° out of phase with the magnetic field (assuming the amplifier input resistance is much greater than the coil resistance) whereas the voltage across the electric antenna 10 is in phase with the electric field, it is necessary to phase shift the output of the amplifier 15 through 90° in order to provide a reference voltage for controlling the phase detector 17. This is accomplished by a phase shifter 19 which is connected between the amplifier 15 and the phase detector 17. The output of the phase detector 17 therefore consists of components which are in phase with the electric field. The output of the amplifier 15 is connected directly to the phase detector 18 to provide a reference for detecting the quadrature component. The outputs of the phase detectors 17 and 18 are respectively fed to a recorder 20. All the circuits described above as well as the antennas are of conventional design. By analyzing the recorded data, the amplitude and phase shift of the secondary fields can be calculated.

In the embodiment of FIG. 3, the horizontal quadrature electric field component is measured as well as the in-phase and quadrature components of the horizontal magnetic field. The horizontal electric field component, which is sensed by a long wire antenna trailed behind the aircraft, is affected by conductivity changes in homogeneous or horizontally stratified earth, unlike the magnetic field components which are in null coupling with horizontal conductors. The ratio of the horizontal quadrature component of the electric field which is parallel to the propagation direction of the ground wave over a horizontal earth to the vertical component of the electric field is proportional to the square root of the resistivity of the earth below the aircraft or other vehicle from which the measurements are made, and this measurement is relatively independent of flying height.

Referring now to FIG. 3, it will be noted that the measurement of the in-phase and quadrature horizontal magnetic field components is exactly the same as indicated in the embodiment of FIG. 2, and like reference numerals refer to similar parts. However, the important difference is that an additional channel is employed for measuring the horizontal quadrature electric field component. The horizontal long wire antenna 12 is connected to an amplifier 21 the output of which is fed to a phase detector 22. The phase detector 22 is referenced by a voltage obtained from the output of the phase shifter 19, so that the output of the phase detector 22 consists of voltages which are in phase quadrature to the voltage across the vertical electric antenna 10. The outputs of the phase detectors 17, 18 and 22 are fed to a recorder 23.

The horizontal antenna 62 is conventional, and it employs a small drag chute or other device for keeping the antenna approximately horizontal. As only the quadrature horizontal components are measured, minor departures from the horizontal do not substantially effect the amplitude of the recorded horizontal electric component.

The system shown in FIG. 4 is similar to the system shown in FIG. 3 except that two additional magnetic antennas are employed, in order to obtain data for the three mutually orthogonal components of the total magnetic field. The parts of the system which are common to that of FIG. 3 are identified by the same reference numerals, and they need not be discussed further as their function is the same. The additional magnetic antennas include a horizontal magnetic antenna 24 which is aligned with flight direction (the horizontal magnetic antenna 11 is orthogonal thereto), and a vertical magnetic antenna 25. The magnetic antennas 24 and 25 are respectively connected to amplifiers 26 and 27, the outputs of which are respectively fed to phase detectors 28, 29 and 30, 31. The phase detectors 29, 31 are referenced by the output of the phase shifter 19, similar to the phase detector 17 previously described, so that the outputs of the phase detectors 29, 31 are in phase with the vertical electric field. The phase detectors 28, 30 are referenced by the output of the amplifier 15, similar to the phase detector 1z8, and hence their outputs are in phase quadrature to the vertical electric field.

The data collected by apparatus shown in FIG. 4 can be analyzed to determine the strike direction of a dipping conductor as well as the dip angle. The analysis is conveniently performed by a computer, which can be programmed to give the direction and amplitude of the in phase and quadrature phase vectors representing the total horizontal magnetic field (using data from the two horizontal magnetic channels) or the total space magnetic field (using data from all three magnetic channels) by taking the square root of the sum of the squares of the recorded signals. It is desirable to at least obtain the total horizontal magnetic field vector, as this vector is relatively independent of changes of heading of the aircraft.

The data collected by the various systems described above is recorded in any conventional manner, such as with a moving paper type recorder or magnetic tape recorder. After the data as been recorded, it must be processed to determine the direction and amplitude of the observed magnetic field at suitably spaced intervals along a traverse. This is most conveniently done with the aid of a digital computer.

As indicated above, the electromagnetic wave propagated through the earth is associated with a ground current sheet which flows radially towards and away from the transmitter at the same frequency as the propagated wave. The current density of the ground current sheet is distorted by local conductive inhomogeneities, giving rise to distortions in the magnetic field sensed by the magnetic field antennas. These distortions tend to mask the secondary fields emanating from ore bodies, and hence it is often desirable to eliminate them if possible. Theoretical studies have indicated that the current ground sheet is very close to being 45° out of phase with respect to the electric field for a wide range of ground conductivities, within about 2° or less. If the magnetic field components are synchronously detected at an angle of 90° to the angle of the phasor representing the current ground sheet, (i.e. at an angle of 135° with respect to the vertical electric field) none of the magnetic field components attributable to the current ground sheet can pass through the synchronous detector, and hence the resulting signal becomes clear of any components due to the current ground sheet. This opration can be performed by a computer, although if desired at 45° phase shifter could be provided in the apparatus for performing this operation. However, the data accumulated by the apparatus (for e.g. shown in FIGS. 3 or 4) contains all the necessary information and it is considered more convenient to process it in the laboratory rather than to add to the complexity of the apparatus carried in the aircraft.

The relative independence of the phase of the vertical electric field component from local variations in conductivity of underlying terrain is independent of frequency, and therefore the upper frequency limit is usually determined by the required penetration depth. Relatively shallow anomalies can thus be explored using higher frequencies and indeed there may be an advantage in using higher frequencies (e.g. up to about 1MHz and possibly higher) if it is desired to eliminate responses due to relatively deep conductors. In the higher frequency domain, however, the groundwave becomes more rapidly attenuated, and therefore the range of the apparatus is more limited. This problem could be overcome to some extent by the use of local transmitters located within a few miles of the area wherein measurements are made.

The following list gives the locations of some typical VLF stations.

| Stations | Location | Frequency |
| --- | --- | --- |
| NAA | Cutler, Maine | 17.8 kHz. |
| NSF | Annapolis, Maryland | 21.4 kHz. |
| NPG | Seattle, Washington | 18.6 kHz. |
| WWVL | Fort Collins, Colorado | 20 kHz. |
| GBR | Rugby, England | 16 kHz. |

The invention is intended mainly to operate in the far field of the transmitter, i.e. greater than about five wavelengths away. In the near field, the phase difference between the vertical electric field component and the horizontal magnetic field component varies in accordance with the distance to the transmitter, but the vertical electric field phase still remains relatively unaffected by changes in ground conductivity. Accordingly, in order to use the vertical electric field as a reference when operating at distances closer than about five wavelengths from the transmitter, the exact position of the transmitter must be known and appropriate adjustments must be made to correct for the variation in phase of the vertical electric field component with distance.

It is desirable to select a VLF radio station (or other source) that is so located that the direction of the magnetic field component propagated through the earth is as nearly as possible at right angles to the main strike of the ore bodies in the area in which the survey is being made. This is not always possible to arrange, and the strike of the ore bodies is not always known in advance. Accordingly, there is an advantage in employing two identical sets of apparatus, each tuned to a different VLF station. The two VLF stations are selected so that the magnetic field components produced thereby cross as closely at right angles as possible in the survey area.

The penetration depth of the system depends upon frequency and the conductivity of the layers of the underlying earth. For homogeneous earth, the calculated skin depth for a frequency of 18 kHz is about 120 meters at an earth resistivity of 1000 ohm-meters, 40 meters at 100 ohm-meters and 10 meters at 10 ohm-meters. Over a horizontally stratified earth, whose stratification is at depths less than the skin depth, vertical profiling can be achieved by measuring ground impedances at two or more substantially different wavelengths. Thus measurements can be made at 18 kHz and 180 kHz which give an approximate variation of 3 in skin depth. If two different impedances are measured, these can be attributed to upper and lower layers of dipping conductivities. The more frequencies that are used, the more precise is the vertical depth profiling, but there are limitations in the upper frequencies which can be used due to the diminishing range of the ground wave as the frequency is raised and to the increasing effects of complex impedances.

In the description above reference has been made to the use of ground waves emanating from VLF stations. However, it is contemplated that the invention can be used in conjunction with fields propagated from lightning discharges. Extremely large currents flow in approximately vertical directions along ionized paths during a lightning strike. This flow of current generates electromagnetic transients which contain a broad range of frequencies varying from about 3 cycles per second up to VHF frequencies. At distances of not less than a few hundred kilometers from a given lightning strike, the predominant energies occur in the vicinity of 8 Hz to 500 Hz and 5,000 Hz to 20 kHz. In these frequency bands good propagation conditions exist in the earth-ionosphere cavity and signals can be picked up many thousands if kilometers from their source. When using lightning discharges as the source of the ground wave, it is impossible to know the exact direction to the source. However, this problem can be overcome by measuring the total horizontal magnetic field, as described above with reference to FIG. 4 and the embodiment is useful down to frequencies of the order of 2 kHz as long as the radiating discharge is distant at least 400 km.

As indicated above, the phase difference between the vertical electric field and the horizontal magnetic field becomes dependent upon distance from the source at distances of less than about 5 wavelengths from the source. When using natural electromagnetic fields (due to lightning discharges, for example) it is desirable to operate at frequencies high enough so that the statistical chances of being more than 5 wavelengths from the source are high (e.g. about 10 kHz). If extra low frequencies are to be used when investigating natural fields, e.g. of the order of 50 Hz or less, precautions should be made to reject any signals emanating from sources less than 5 wavelengths away. For example, the locations of major storm centers could be determined from weather information provided by government weather bureaus.

The data collected by the apparatus described herein lends itself very well to computer analysis. If desired, a minimum of signal processing can be carried out in the aircraft, leaving the computer the task of analyzing the data. For example, it is possible to simply contemporaneously record the radio frequency signals picked up by the vertical electric antenna and the magnetic antennas without the use of phase detectors in the aircraft, and later feed this raw data to a computer which can extract the in phase and quadrature components of the magnetic signals.

What I claim as my invention is:

1. A method of sensing distortions in an electromagnetic field which penetrates the earth, said electromagnetic field being radiated by a distant source of electromagnetic energy, said electromagnetic field comprising a generally horizontal alternating magnetic field which is distorted when it intersects inhomogeneities in earth conductivity, and a substantially vertical alternating electric field component which is substantially unaffected by inhomogeneities in earth conductivity, said method comprising:

receiving along a predetermined path, a first reference signal having a fixed phase relationship to the phase of the vertical alternating electric field component, said first signal being substantially independent of all components of said electromagnetic field other than said vertical electric field component, and said first signal constituting a reference signal against which magnetic field variations may be compared, and recording the amplitude of said first signal as a function of time to preserve the phase and amplitude information contained therein, receiving a second signal having a fixed phase relationship to the phase of at least one directional component of said alternating magnetic field and recording said second signal contemporaneously with said first signal to preserve the relative phase and amplitude information contained therein, and comparing the amplitude and phase of said first and second signals.

2. A method as claimed in claim 1 including the additional steps of receiving and recording, along the said predetermined path, another directional component of said alternating magnetic field, said magnetic components being horizontal and being mutually orthogonal, and measuring the amplitudes of any portions of said alternating magnetic field components which are in phase quadrature to said vertical alternating electric field component.

3. A method as claimed in claim 2 including the additional step of obtaining the square root of the sum of the squares of the amplitudes of each of said quadrature magnetic field components.

4. A method as claimed in claim 2 including measuring the amplitudes of any portions of said magnetic field components which are in phase with said vertical alternating electric field component.

5. A method as claimed in claim 4 including the additional step of measuring a horizontal component of the alternating electric field that is in phase quadrature to said vertical alternating electric field component and is parallel to the direction of propagation of said electromagnetic field.

6. A method as claimed in claim 5 including the additional step of obtaining the ratio of the said measured quadrature horizontal alternating electric field to the vertical component of the alternating electric field.

7. A method as claimed in claim 1 including the additional step of removing from said second signal components which are in phase quadrature to a phasor having an angle of 45° with respect to the phase of said vertical alternating electric field component.

* * * * *